Patented May 7, 1929.

1,711,639

UNITED STATES PATENT OFFICE.

LEON W. GELLER, OF HAMBURG, NEW YORK, ASSIGNOR TO NATIONAL ANILINE & CHEMICAL CO., INC., OF NEW YORK, N. Y., A CORPORATION OF NEW YORK.

MONAZO DYES OF THE PYRAZOLONE SERIES.

No Drawing.   Application filed October 9, 1925. Serial No. 61,590.

This invention relates to the production of new monazo dyes of the pyrazolone series which are of value for dyeing wool and other material. They also form valuable lakes or pigments. Material dyed or printed with the new azo dyestuffs also constitute a part of the present invention.

The new dyestuffs may be obtained by coupling the diazo compounds of an orthoaminonaphthol sulfonic acid, more particularly 1.2 and 2.1-aminonaphthol sulfonic acids, and especially 1.2-aminonaphthol-4-sulfonic acid, and which may contain a nitro-group substituted in the naphthalene nucleus, with the 1-aryl-5-pyrazolones of the benzene series which contain a sulfo-group, and may also contain halogen, as a substituent in the aryl nucleus.

The new dyestuffs correspond with the general formula

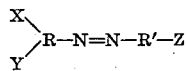

wherein R signifies a 1-aryl-5-pyrazolone of the benzene series which contains a sulfo group in its phenyl nucleus, X and Y a hydrogen or a halogen atom in the phenyl nucleus, R' a sulfonated naphthyl nucleus which contains a hydroxyl group in ortho-position to the azo bridge, and Z a hydrogen atom or a nitro group in the naphthalene nucleus. The new dyestuffs form red-yellow to dark-brown powders which are soluble in water giving orange-yellow to reddish-brown solutions. They dye wool in an acid bath orange-yellow to brown shades which on being after-chromed change to yellow-red to blue-red tints.

In producing the azo dyestuffs of the present invention, one molecular proportion of the diazo compound of the o-aminonaphthol sulfonic acid is added to a well-stirred solution of the pyrazolone sulfonic acid (in slight execess of one molecular proportion) which is rendered and kept slightly alkaline throughout the reaction. When the coupling is completed, the mixture is heated to about 40°–90° C. and the dyestuff isolated in any suitable manner.

The following specific example will further illustrate the invention, but it is understood that the invention is not limited thereto. The parts are by weight.

*Example.*—54.5 parts of the sodium salt of the diazo compound of 1-amino-2-hydroxy-naphthalene-4-sulfonic acid are introduced into a cooled solution of 55.5 parts of the sodium salt of 1-(4'-sulfophenyl)-3-methyl-5-pyrazolone dissolved in 1000 parts water containing a sufficient quantity of sodium carbonate to maintain an alkaline reaction throughout the combination. The mixture is stirred for several hours, and when the combination is complete, the solution is heated to about 70° C., and the dyestuff isolated by acidifying the solution with hydrochloric acid, adding common salt, cooling to about 40° C., and then filtering, pressing and drying in the usual manner.

The product thus obtained, and which corresponds with the formula:

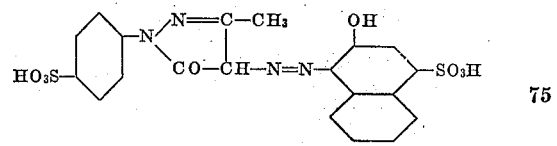

is a brownish powder, soluble in water to give an orange solution which on boiling with zinc dust produces a violet color; and is soluble in concentrated sulfuric acid to form a red solution which on dilution with ice changes to an orange. It dyes wool from an acid bath orange-brown shades which on being after-chromed yield bluish-red tints of excellent fastness to light, washing, fulling and potting. In dyeing wool interwoven with silk, the silk is stained very little, if at all. The analogous dyestuff prepared from the 1-(2'-chlor-4'-sulfophenyl)-3-methyl-5-pyrazolone dyes wool similar shades which, when after-chromed, produce somewhat yellower tints of red.

In an analogous manner, dyestuffs which show similar properties may be produced by coupling on the one hand the same or another 1-sulfoaryl-5-pyrazolone of the benzene series or a halogen derivative thereof, for example, 1-(2'.5'-dichlor-3'-sulfophenyl)-5-pyrazolone, 1-(2'.5'-dichlor-4'-sulfophenyl)-5-pyrazolone, 1-(2'.3'-dichlor-6'-sulfophenyl)-5-pyrazolone, 1-(3'.4'-dichlor-6'-sulfophenyl)-5-pyrazolone, 1-(2'.3'-dichlor-5'-sulfophenyl)-5-pyrazolone, 1-(3'.4'-dichlor-5'-sulfophenyl)-5-pyrazolone, 1-(2'.4'-dichlor-5'-sulfophenyl)-5-pyrazolone, 1-(3'.6'-disulfophenyl)-5-pyrazolone, 1-(2'.4'-disulfophenyl)-5-pyrazolone, 1-(2'-methyl-5'-sulfophenyl)-5-pyrazolone, 1-(2'-methyl-5'-sulfophenyl)-5-pyrazolone, 1-(4'-methyl-5'-sulfophenyl)-5- pyrazolone, 1-(4'-methyl-6'-sulfophenyl)-5-pyrazolone, 1-(2'.4'-dimethyl-6'-sulfophenyl)-5-pyrazolone, 1-(3'.6'-dimethyl-4'-sulfophenyl)-5-pyrazolone, 1-(3'-chlor-4'-methyl-6'-sulfophenyl)-5-pyrazolone, 1-(3'-methyl-4'-chlor-6-sulfophenyl)-5-pyrazolone, 1-(2'-methyl-5'-chlor-4'-sulfophenyl)-5-pyrazolone, etc., with the diazo compound on the other hand of the same or another o-aminonaphthol sulfonic acid or a nitro derivative thereof, for example, the nitrated diazo-compound of 1-amino-2-hydroxynaphthalene-4-sulfonic acid, or the diazo compound of 1.2-aminonaphthol-6-sulfonic acid, 1.2-aminonaphthol-3.6-disulfonic acid, 2.1-aminonaphthol-5-sulfonic acid, etc. It will be understood that the derivatives of 5-pyrazolone mentioned above carry a methyl or a carboxyl group in the 3-position of the pyrazolone nucleus unless otherwise specified.

I claim:

1. As a new product, a monazo dyestuff which in the free state contains a grouping which corresponds with the probable formula

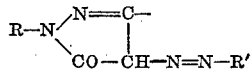

wherein R signifies an aryl hydrocarbon radical of the benzene series which contains one or more sulfonic acid groups, and may contain one or two halogen atoms, as substituents in the benzene nucleus of the aryl radical which is otherwise free from substituents, and R' denotes a sulfonated naphthalene nucleus which is free from substituents other than a single nitro group which may be present and a hydroxyl group which is present and adheres to one of the positions 1 and 2 of the naphthalene nucleus and the azo bridge adheres to the other of said positions.

2. As a new product, a monazo dyestuff which corresponds with the probable formula

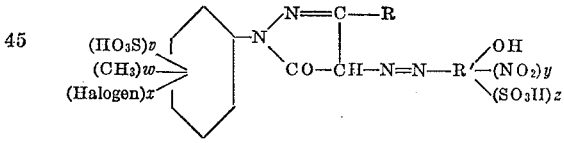

wherein $v=1$ or $2$; $w=0, 1$ or $2$; $x=0, 1$ or $2$; $y=0$ or $1$; $z=1$ or $2$; R denotes a methyl or a carboxyl group; and R' represents a naphthalene nucleus in which the hydroxyl group adheres thereto in one of the positions 1 and 2 and the azo group adheres to the other of said positions.

3. As a new dyestuff, a monazo dyestuff which corresponds with the probable formula

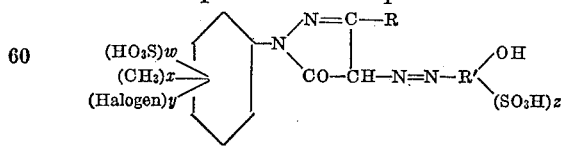

wherein $w=1$ or $2$; $x=0, 1$ or $2$; $y=0, 1$ or $2$; $z=1$ or $2$; R denotes a methyl or a carboxyl group; and R' signifies a naphthalene nucleus in which the hydroxyl group adheres thereto in one of the positions 1 and 2 and the azo group adheres to the other of said positions.

4. As a new product, a monazo dyestuff which corresponds with the probable formula

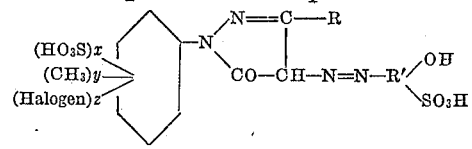

wherein $x=1$ or $2$; $y=0, 1$ or $2$; $z=0, 1$ or $2$; R denotes a methyl or a carboxyl group; and R' signifies a naphthalene nucleus in which the hydroxyl group adheres thereto in one of the two positions 1 and 2 and the azo group adheres to the other of said positions.

5. As a new product, a monazo dyestuff which corresponds with the probable formula

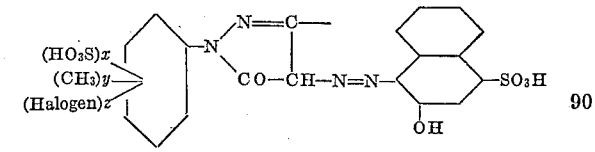

wherein $x=1$ or $2$; $y=0, 1$ or $2$; $z=0, 1$ or $2$; and R denotes a methyl or a carboxyl group.

6. As a new product, a monazo dyestuff which corresponds with the probable formula

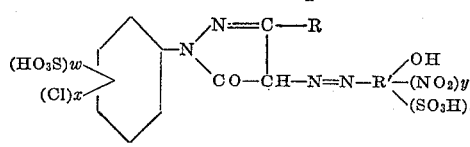

wherein $w=1$ or $2$; $x=0, 1$ or $2$; $y=0$ or $1$; $z=1$ or $2$; R denotes a methyl or a carboxyl group; and R' represents a naphthalene nucleus in which the hydroxyl group is attached to one of the positions 1 and 2 and the azo bridge is attached to the other of said positions.

7. As a new product, a monazo dyestuff which corresponds with the probable formula

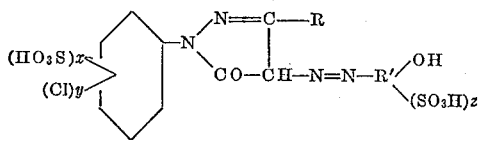

wherein $x=1$ or $2$; $y=0, 1$ or $2$; $z=1$ or $2$; R signifies a methyl or a carboxyl group; and R' denotes a naphthalene nuclus in which the hydroxyl group adheres to one of the two positions 1 and 2 and the azo bridge adheres to the other of said positions.

8. As a new product, a monazo dyestuff which corresponds with the probable formula

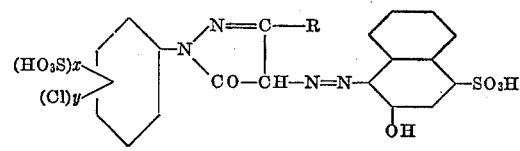

wherein $x=1$ or 2; $y=0$, 1 or 2; and R denotes a methyl or a carboxyl group.

9. As a new product, a monazo dyestuff which corresponds with the probable formula

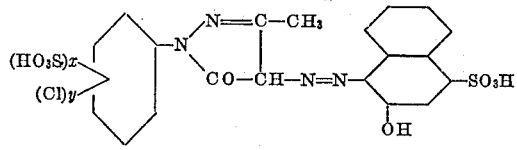

wherein $x=1$ or 2 and $y=0$, 1 or 2.

10. As a new product, a monazo dyestuff which corresponds with the probable formula

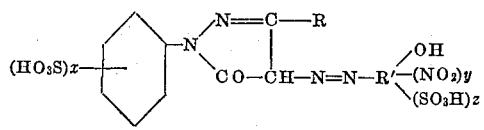

wherein $x=1$ or 2; $y=0$ or 1; $z=1$ or 2; R denotes a methyl or a carboxyl group; and R' signifies a naphthalene nucleus having the hydroxyl group attached to one of the positions 1 and 2 and the azo group attached to the other of said positions.

11. As a new product, a monazo dyestuff which corresponds with the probable formula

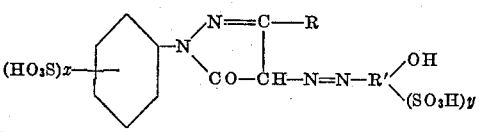

wherein $x=1$ or 2; $y=1$ or 2; R signifies a methyl or a carboxyl group; and R' denotes a naphthalene nucleus having the hydroxyl group adhering to one of the positions 1 and 2 and the azo group adhering to the other of said positions.

12. As a new product, a monazo dyestuff which corresponds with the probable formula

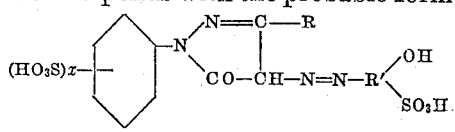

wherein $x=1$ or 2; R denotes a methyl or a carboxyl group; and R' signifies a naphthalene nucleus having the hydroxyl group attached to one of the two positions 1 and 2 and the azo group attached to the other of said positions.

13. As a new product, a monazo dyestuff which corresponds with the probable formula

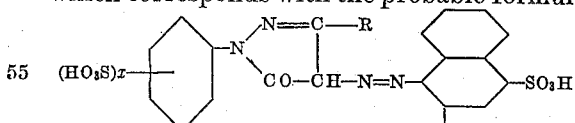

wherein $x=1$ or 2, and R denotes a methyl or a carboxyl group.

14. As a new product, a monazo dyestuff which corresponds with the probable formula

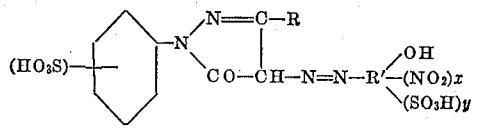

wherein $x=0$ or 1; $y=1$ or 2; R denotes a methyl or a carboxyl group; and R' signifies a naphthalene nucleus having the hydroxyl attached to one of the two positions 1 and 2 and the azo group attached to the other of said positions.

15. As a new product, a monazo dyestuff which corresponds with the probable formula

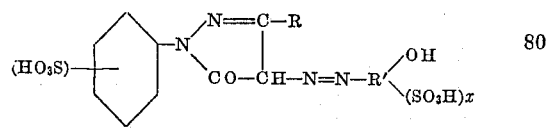

wherein $x=1$ or 2; R signifies a methyl or a carboxyl group; and R' denotes a naphthalene nucleus having the hydroxyl group attached to one of the two positions 1 and 2 and the azo group attached to the other of said positions.

16. As a new product, a monazo dyestuff which corresponds with the probable formula

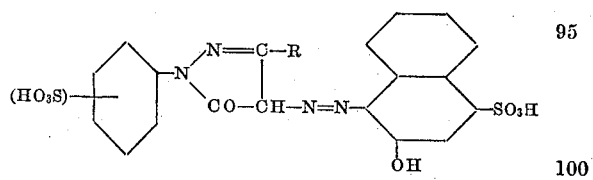

wherein R denotes a methyl or a carboxyl group.

17. As a new product, the monazo pyrazolone dyestuff which corresponds with the formula

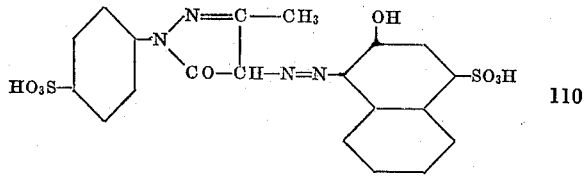

18. As a new product, a monazo dyestuff which corresponds with the probable formula

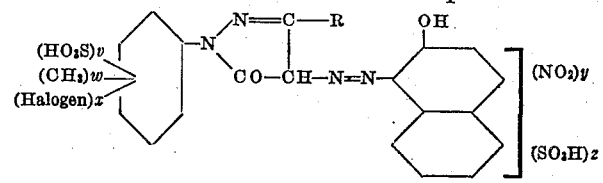

wherein $v=1$ or 2; $w=0$, 1, or 2; $x=0$, 1, or 2; $y=0$ or 1; $z=1$ or 2; and R denotes a methyl or a carboxyl group.

19. As a new product, a monazo dyestuff which corresponds with the probable formula

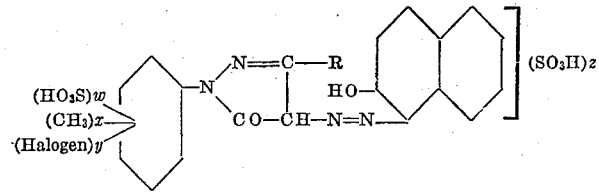

wherein $w=1$ or 2; $x=0$, 1, or 2; $y=0$, 1, or 2; $z=1$ or 2; and R denotes a methyl or a carboxyl group.

20. As a new product, a monazo dyestuff which corresponds with the probable formula

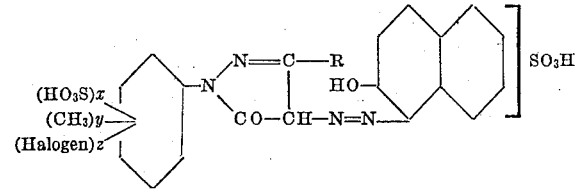

wherein $x=1$ or 2; $y=0$, 1, or 2; $z=0$, 1, or 2; and R denotes a methyl or a carboxyl group.

21. As a new product, a monazo dyestuff which corresponds with the probable formula

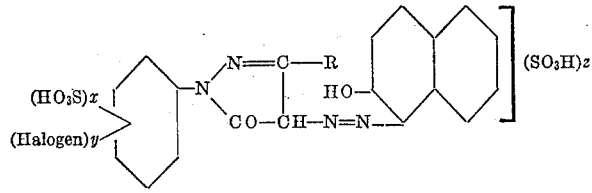

wherein $x=1$ or 2; $y=0$, 1, or 2; $z=1$ or 2; and R denotes a methyl or a carboxyl group.

22. As a new product, a monazo dyestuff which corresponds with the probable formula

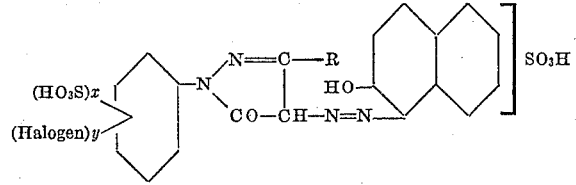

wherein $x=1$ or 2; $y=0$, 1 or 2; and R denotes a methyl or a carboxyl group.

23. As a new product, a monazo dyestuff which corresponds with the probable formula

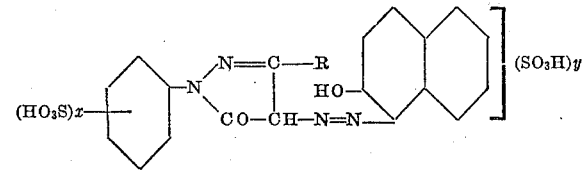

wherein $x=1$ or 2; $y=1$ or 2; and R denotes a methyl or a carboxyl group.

24. As a new product, a monazo dyestuff which corresponds with the probable formula

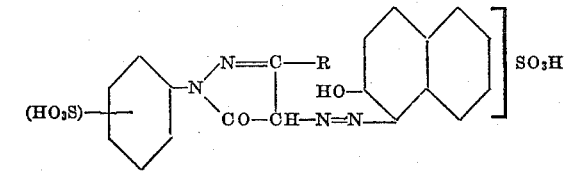

wherein R denotes a methyl or a carboxyl group.

25. As a new product, a monazo dyestuff which corresponds with the probable formula:

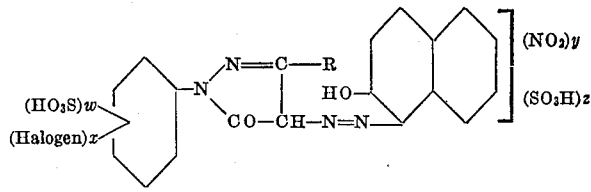

wherein $w=1$ or 2; $x=0$, 1 or 2; $y=0$ or 1; $z=1$ or 2; and R denotes a methyl or a carboxyl group.

26. As a new product, a monazo dyestuff which corresponds with the probable formula:

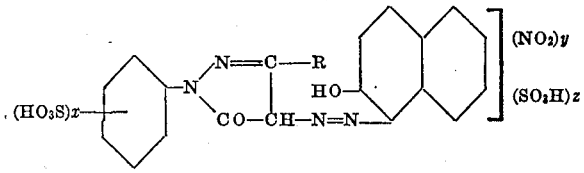

wherein $x=1$ or 2; $y=0$ or 1; $z=1$ or 2; and R denotes a methyl or a carboxyl group.

27. Material dyed with a dyestuff of claim 1.
28. Material dyed with a dyestuff of claim 2.
29. Material dyed with a dyestuff of claim 3.
30. Material dyed with a dyestuff of claim 4.
31. Material dyed with a dyestuff of claim 5.
32. Material dyed with a dyestuff of claim 6.
33. Material dyed with a dyestuff of claim 7.
34. Material dyed with a dyestuff of claim 8.
35. Material dyed with a dyestuff of claim 9.
36. Material dyed with a dyestuff of claim 10.
37. Material dyed with a dyestuff of claim 11.
38. Material dyed with a dyestuff of claim 12.
39. Material dyed with a dyestuff of clam 13.
40. Material dyed with a dyestuff of claim 14.
41. Material dyed with a dyestuff of claim 15.
42. Material dyed with a dyestuff of claim 16.
43. Material dyed with a dyestuff of claim 17.
44. Material dyed with a dyestuff of claim 18.
45. Material dyed with a dyestuff of claim 19.
46. Material dyed with a dyestuff of claim 20.
47. Material dyed with a dyestuff of claim 21.
48. Material dyed with a dyestuff of claim 22.
49. Material dyed with a dyestuff of claim 23.
50. Material dyed with a dyestuff of claim 24.
51. Material dyed with a dyestuff of claim 25.
52. Material dyed with a dyestuff of claim 26.

In testimony whereof I affix my signature.

LEON W. GELLER.

CERTIFICATE OF CORRECTION.

Patent No. 1,711,639. Granted May 7, 1929, to

LEON W. GELLER.

It is hereby certified that error appears in the printed specification of the above numbered patent requiring correction as follows: Page 1, line 108, "(2'-methyl-5'-sulfophenyl)" should be "(2'-methyl-4'-sulfophenyl)"; page 2, line 87, claim 5, in the formula insert "R"; same page, line 120, claim 7, for the misspelled word "nuclus" read "nucleus"; and that the said Letters Patent should be read with these corrections therein that the same may conform to the record of the case in the Patent Office.

Signed and sealed this 4th day of June, A. D. 1929.

(Seal)

M. J. Moore,
Acting Commissioner of Patents.